United States Patent [19]

Grenie et al.

[11] Patent Number: 5,097,875
[45] Date of Patent: Mar. 24, 1992

[54] PORTABLE REINFLATOR

[75] Inventors: Philippe Grenie, Greenville, S.C.; Jean-Michel Mauduit, Meudon-La-Foret; Patrick Marguerie, Lyons, both of France

[73] Assignee: Compagnie Generale des Etablissements Michelin-Michelin & Cie, Clermont-Ferrand Cedex, France

[21] Appl. No.: 586,137

[22] Filed: Sep. 21, 1990

Related U.S. Application Data

[62] Division of Ser. No. 388,616, Aug. 2, 1989, Pat. No. 4,981,162.

[30] Foreign Application Priority Data

Aug. 5, 1988 [FR] France ............... 88/10771

[51] Int. Cl.⁵ .................................. F04B 17/6
[52] U.S. Cl. ................................... 141/38; 141/98; 417/231; 152/417
[58] Field of Search ............ 141/38, 48; 417/231, 417/233, 234; 152/415–417; 137/223, 231; 224/273

[56] References Cited

U.S. PATENT DOCUMENTS

| | | | |
|---|---|---|---|
| 598,748 | 2/1898 | Schwone | 417/233 |
| 607,217 | 7/1898 | Christensen | 417/233 |
| 862,099 | 7/1907 | Olson | 152/416 |
| 867,942 | 10/1907 | Bobrick | 141/38 |
| 1,026,667 | 5/1912 | Foster | 152/417 |
| 1,054,504 | 2/1913 | Burgraff, Jr. | 152/417 |
| 1,165,057 | 12/1915 | Bayly | 152/417 |
| 1,165,876 | 12/1915 | Heberling | 152/417 |
| 1,236,554 | 8/1917 | Fahrney | 417/233 |
| 1,241,696 | 10/1917 | Arnett | 152/416 |
| 1,289,064 | 12/1918 | Culp | 417/233 |
| 1,322,196 | 11/1919 | Meyers | 152/417 |
| 1,486,798 | 3/1924 | Reed | 152/415 |
| 1,647,818 | 11/1927 | Semak | 141/38 |
| 1,667,051 | 4/1928 | Rice | 152/417 |
| 1,801,716 | 4/1931 | Bowers | 152/417 |
| 2,579,048 | 12/1951 | Paul | 152/416 |
| 4,187,058 | 2/1980 | Fish | 417/234 |
| 4,840,212 | 6/1989 | Wei | 141/38 X |

FOREIGN PATENT DOCUMENTS

| 0342004 | 1/1931 | United Kingdom | 152/416 |
|---|---|---|---|
| 0470964 | 8/1937 | United Kingdom | 417/231 |

*Primary Examiner*—Charles E. Phillips
*Assistant Examiner*—Casey Jacyna
*Attorney, Agent, or Firm*—Oblon, Spivak, McClelland, Maier & Neustadt

[57] ABSTRACT

Portable reinflator for a tire of a vehicle, to be connected to an electric source of the vehicle and to the valve of the defective tire includes an electric connector, a compressor, a rotary seal and a valve coupler. The reinflator also includes an electric connection running from the connector to the compressor, a first pneumatic line running from the compressor to the rotary seal, and a second pneumatic line running from the rotary seal to the valve coupler. The portable reinflator is used in repairs to replace air inside the tire as it escapes from the tire in the case of puncture.

3 Claims, 3 Drawing Sheets

PORTABLE REINFLATOR

This is a division, of application Ser. No. 07/388,616, filed on Aug. 2, 1989 now U.S. Pat. No. 4,981,162.

BACKGROUND OF THE INVENTION

1. Field of the Invention

This invention relates to the repair of a vehicle whose tire exhibits a loss of inflation pressure.

2. Description of the Related Art

If a tire undergoes damage resulting in a loss of its internal inflation pressure, it is no longer capable of providing the service for which it is designed. The now widespread solution consists in providing equipment called a "spare wheel." Numerous other solutions which are intended to confer on the wheel-tire unit a certain capacity for carrying a load in the case of puncture, by providing a suitable support, most often inside the pneumatic cavity itself (rigid supports, connected to the interior of the rim or integrated into it, flexible supports, foam rubber strips) are also known.

For vehicles which must circulate in difficult and variable conditions, systems integrated into the vehicle are known; these systems make it possible to regulate the inflation pressure of the tires from the driver's place, even while driving.

SUMMARY OF THE INVENTION

Accordingly, an object of this invention is to provide for a novel device which can cope with the difficulties due to the losses of pressure which tires can undergo without the need for the modification of wheels, or of existing tires, or of the vehicles that they equip. This new device should be easier to use than mounting a spare wheel. The bulk and weight of the device should be less than that of the spare tire. The use of the device should not cause any alteration of the tire, which should be preserved after repair driving.

The invention consists of an auxiliary reinflator, usable both when the vehicle is stopped and when it is moving, making it possible to replace air in the tire as it escapes from the tire. In this ay, by a simple electric connection to the vehicle, and a simple pneumatic connection to the valve of the defective tire, without bothersome dismantling, a temporary repair is assured which makes it possible to reach the place of destination, or a service station able to make a permanent repair.

The present invention relates to a portable reinflator for a tire of a vehicle. The reinflator is to be connected to an electric source of the vehicle and to a valve of a defective tire. The reinflator comprises: an electric connector, a compressor, a rotary seal, and a valve coupler. The reinflator also comprises an electric connection connecting the electric connector to the compressor; a first pneumatic line connecting the compressor to the rotary seal; and a second pneumatic line connecting the rotary seal to the valve coupler.

BRIEF DESCRIPTION OF THE DRAWINGS

A more complete appreciation of the invention and many of the attendant advantages thereof will be readily obtained as the same becomes better understood by reference to he following detailed description when considered in connection with the accompanying drawings, wherein.

DESCRIPTION OF THE PREFERRED EMBODIMENTS

Figure 1:
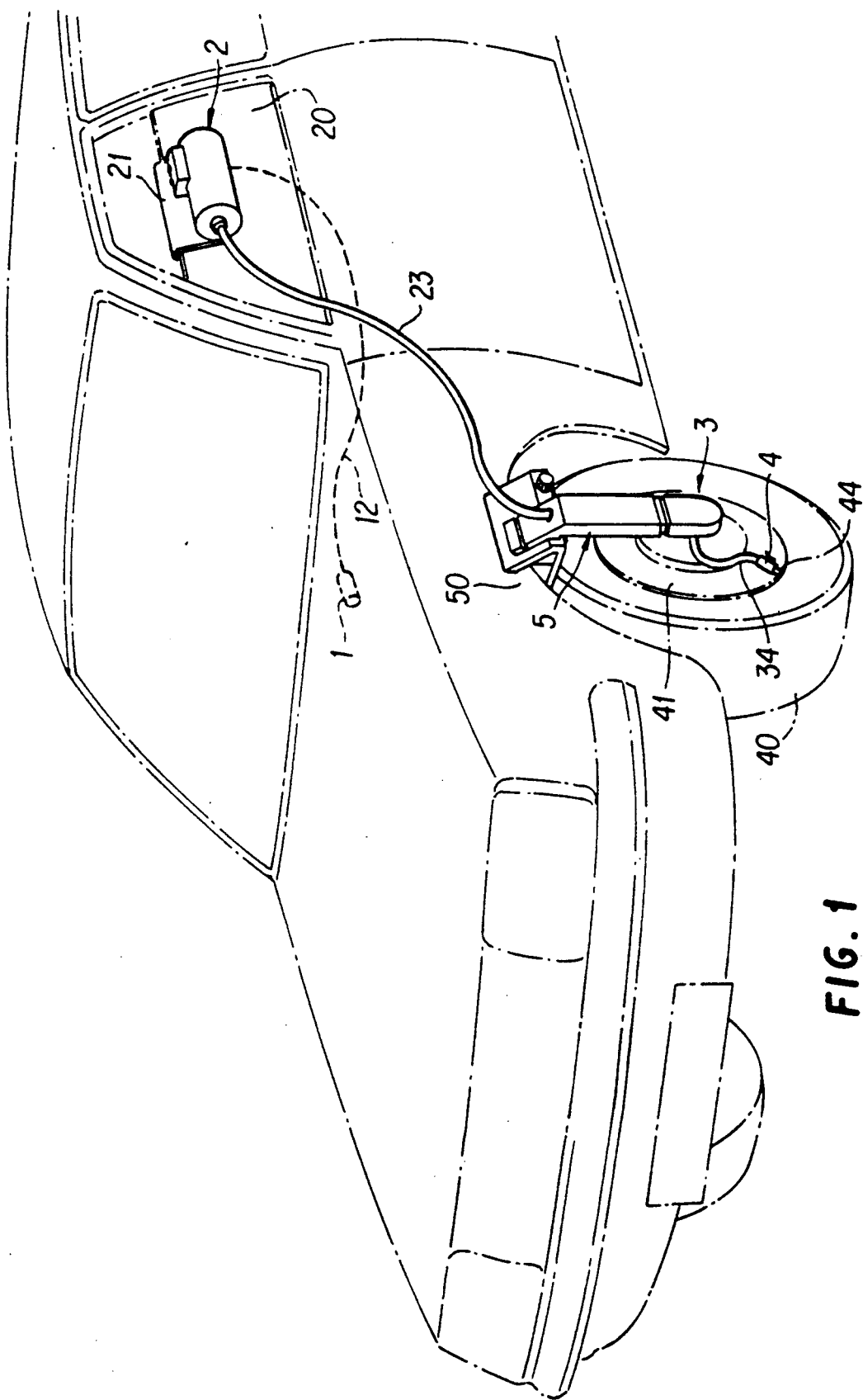
FIG. 1 shows a vehicle equipped with a portable reinflator.

FIG. 1 illustrates the principle of the temporary and very simple installation of the portable reinflator. The reinflator includes an electric connector 1 on the vehicle, for example a plug of the kind which can be plugged into the support of the cigarette lighter. For vehicles not equipped with cigarette lighters, a direct connection to the battery can be very easily provided. Also included is an electric connection 12 which connects the electric connector 1 to a compressor 2, the compressor 2 includes a pneumatic line 23 which runs to a rotary seal 3, which includes a pneumatic line 34 which ends in an adaptable valve coupler 4 on valve 44 of defective tire 40.

The reinflator of the present invention includes means for limiting the pressure to a "threshold" or predetermined value and is therefore adaptable to the field of application. Thus, for example, for passenger vehicles, the nominal inflating pressure is on the order of 2 bars. If it is desired that the portable reinflator be multipurpose, a pressure threshold in the order of 1.7 bar can be adopted, which makes it possible to repair the tires of passenger vehicles functioning at low pressure, without reaching a pressure that is really excessive for them, as well as repairing tires requiring higher pressures, reaching a sufficient pressure for them to move a vehicle at speeds in the order of 100 to 120 km/h, considered sufficient for a temporary repair. The pressure self-limitation can be provided by an appropriate regulation device or the compressor may be designed so as not to be able to exceed the desired threshold pressure (relief valve, intrinsic limitation, . . .).

In addition, means are provided to maintain rotary seal 3 close to the axis of rotation of tire 40. Rotary seal 3 can be mechanically connected either to wheel 41 or to the vehicle.

In FIG. 1, arm 5 is seen supported on fender 50 of the vehicle so as to immobilize rotary seal 3 mounted on the end of arm 5 relative to fender 50. In this case, pneumatic line 34 connected to coupler 4 of valve 44 must be sufficiently long, flexible and solid to allow for the suspension travel. For steered wheels, the installation of arm 5 on fender 50 must be such that there is not only no contact with the tire during steering but also such that there always remains between wheel 41 and arm 5 the necessary clearance for the free passage of line 34. Preferably arm 5 is attached perpendicularly to the axis of rotation of wheel 41.

Figure 2:
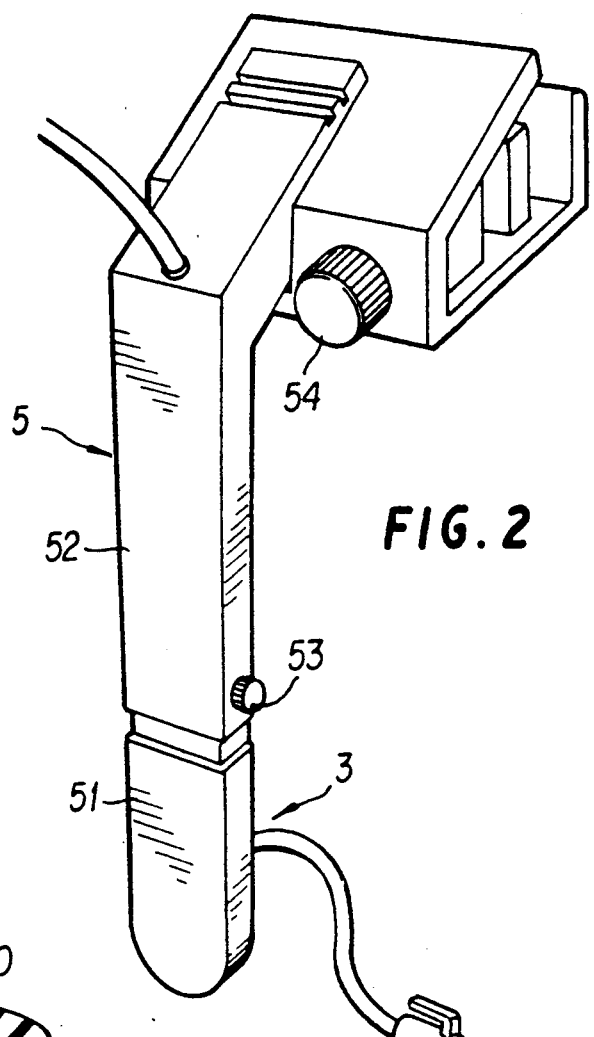
FIGS. 2 and 3 show a reinflator element.

Arm 5 comprises a means for adjusting its length so that after it is attached to fender 50, rotary seal 3 can be placed opposite the axis of rotation of wheel 41 (see particularly FIG. 2). Arm 5 consists of two parts 51 and 52, one part 51 sliding in the other 52, with locking screw 53 making it possible to immobilize part 51 carrying rotary seal 3 relative to part 52 of arm 5 attached on fender 50.

Figure 3:
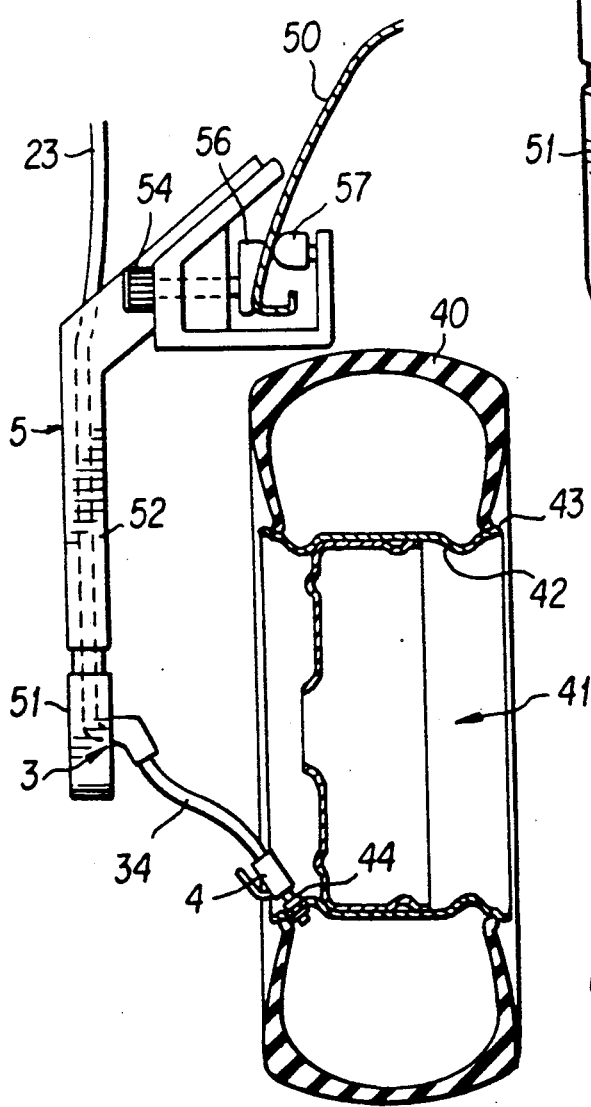

FIG. 3 diagrammatically shows how a removable attachment to the lower edge of fender 50 can be made. Knurled knob 54 controls the movement of presser 56 relative to stop 57 resting on the inside of the fender on the fold of the sheet metal. Thus a clamp is constituted which can firmly immobilize arm 5 relative to fender 50 without causing degradation or damage to the auto body.

Compressor 2 can be placed inside or outside the vehicle. If the installation is on the outside, pneumatic line 23 running from compressor 2 to rotary seal 3 does not have to go through the body. Passage of a simple electric cable (connection 12), for example, through a door of the vehicle, does not pose any problem. Window 20 of a door is an advantageous support for compressor 2. It allows for easy and solid installation, for example by one or more hooks 21 which fit on the upper edge of the window. It is possible for this hook or hooks 21 to be sufficiently thin to allow for winding up window 20. Thus, there is a very secure attachment of compressor 2. Its particularly visible position also makes it possible to constantly remind the driver that he is using an emergency device. In addition, a pressure gage which is visible through window 20 can be added. As a variant, appropriate means can be incorporated into electric connector 1 to inform the driver of the pressure level of the tire.

Figure 4:
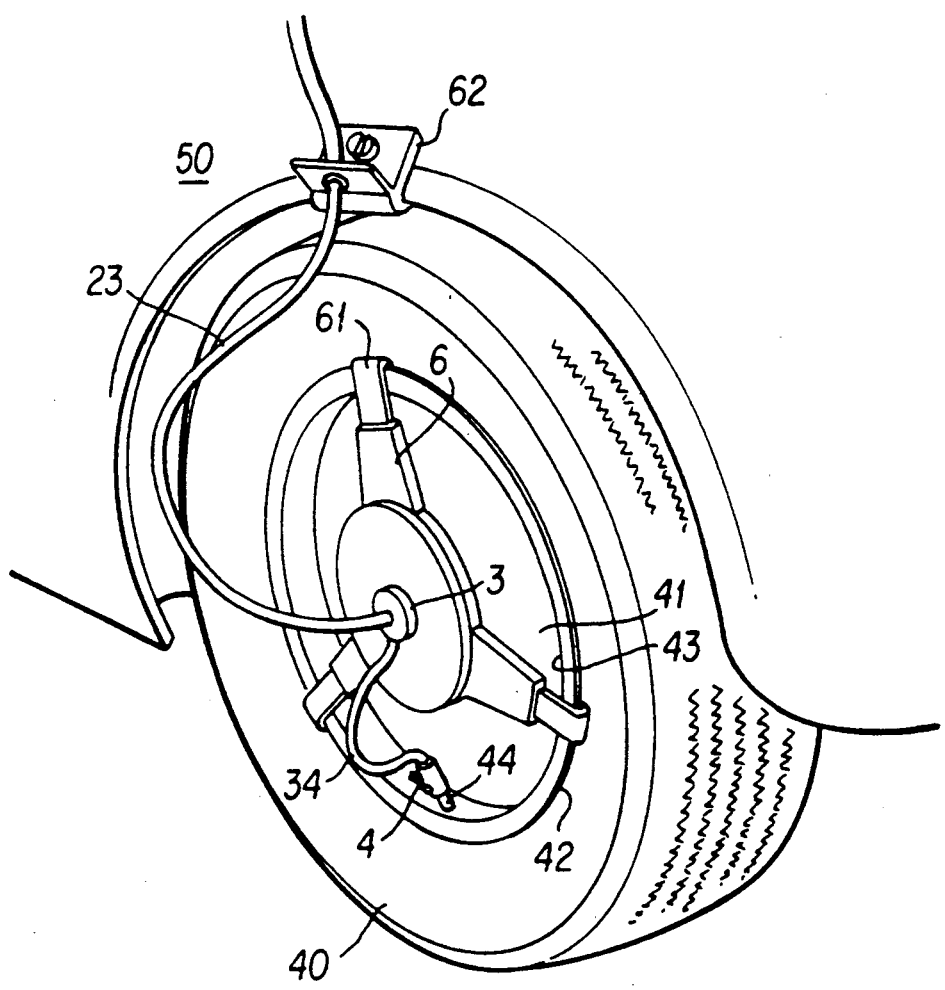
FIG. 4 shows a further embodiment.

FIG. 4 illustrates a further embodiment of the means for maintaining rotary seal 3. In FIG. 4, the rotary seal 3 is connected to wheel 41 by at least three clamps 6, each one provided with a hook 61 on the end, intended to work together with flange 42 of rim 43 on which tire 40 is mounted.

Support is achieved radially on the outside on the flange 42. Preferably there are three clamps 6, of which one is of variable length to assure tightening of the unit on flange 42 of rim 43. The latitude of length adjustment can be such that the connection by this device with three clamps 6 in a star can be adapted to several diameters of rim 43. The positioning of hooks 61 on flange 42 of rim 43, between wheel 41 and tire 40, makes it possible to achieve a universal attachment, because this zone is subject to quite precise standardization, while any other area of wheel 41 is produced very differently from one vehicle to another. Further, the installation does not damage either wheel 41 or tire 40, and can be done very easily because when tire 40 is deflated, the pressure of the beads of tire 40 on flange 42 of the rim is moderate. The introduction of hooks 61 is therefore done very easily: for example, first the hooks of clamps 6 unvariable in length are positioned in such a way that said hooks are placed on both sides of the area of contact with the ground, then third hook 61 is inserted and the tightening is performed. Any tension device whatsoever, whether spring, strap, toggle joint or other, can be suitable. A simple clamp 62 attaches line 23 running from compressor 2 to rotary seal 3 to fender 50, to avoid any contact with tire 40 in motion.

If it is accepted to modify the wheel or its cover cap, the wheel or its cover can be drilled in its center and attachment by screwing or attachment by clip can be provided.

The production of rotary seal 3 does not pose any particular problem: a male/female type fit is provided, with a lock preventing any disengagement. A simple O-ring provides a seal, with sufficient reliability because, on the one hand, the small dimensions assure limited relative speeds of movement, and, on the other hand, it is a question of a device for occasional use.

Of course, multiple variant embodiments can be provided, particularly for the attachments or for locating compressor 2, or of rotary seal 3, which could be connected to the valve. For example, compressor 2 could be integral with the maintenance means of rotary seal 3, connecting rotary seal 3 to wheel 41. Additional intermediate fasteners can be provided for the pneumatic line. If need be, a set of accessories could be provided to adapt the installation of the portable reinflator to different vehicles.

In case the compressor is attached to the wheel, it is possible to envisage making it turn along with the wheel. In this case, there is no rotary seal, but a rotary electric contact between the compressor and the electric connector on the vehicle.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A portable reinflator for a tire of a vehicle, wherein said reinflator is to be connected to an electric source of the vehicle and to a valve of a defective tire, said reinflator comprising:
    an electric connector, a compressor, a rotary seal, and a valve coupler;
    an electric connection connecting said electric connector to said compressor;
    a first pneumatic line connecting said compressor to said rotary seal;
    a second pneumatic line connecting said rotary seal to said valve coupler; and
    means for maintaining said rotary seal close to an axis of rotation of said tire, wherein said means for maintaining said rotary seal close to the axis of rotation of said tire comprises at least three clamps, each clamp being provided on its end with a hook which can be attached to a flange of a rim on which said tire is mounted, wherein support is achieved radially on the outside of said flange.

2. Reinflator according to claim 1, wherein one of said at least three clamps is of variable length and comprises a device to perform tightening of the flange of said rim.

3. A portable reinflator for inflating a defective tire mounted on a wheel of a vehicle, wherein said reinflator is adapted to be connected to an electric source of the vehicle and to a valve of said defective tire, said reinflator comprising:
    an electric connector, a compressor, a rotary seal, and a valve coupler;
    an electric connection connecting said electric connector to said compressor;
    a first pneumatic line connecting said compressor to said rotary seal;
    a second pneumatic line connecting said rotary seal to said valve coupler; and
    at least three clamps for attaching said rotary seal to said wheel and maintaining said rotary seal close to an axis of rotation of said tire, each clamp radially extending from said rotary seal to different positions on a flange of said wheel on which said tire is mounted and each clamp being provided on its end with a hook which can be attached to said flange of said wheel on which said tire is mounted, wherein support is achieved radially on the outside of said flange and one of said at least three clamps is of variable length for permitting said clamps to be used on tires of different diameters.

* * * * *